US009616820B2

(12) United States Patent
Raley

(10) Patent No.: US 9,616,820 B2
(45) Date of Patent: Apr. 11, 2017

(54) STORAGE CONTAINER ATTACHABLE TO VEHICLE HITCH

(71) Applicant: Patrick Raley, Millville, CA (US)

(72) Inventor: Patrick Raley, Millville, CA (US)

( * ) Notice: Subject to any disclaimer, the term of this patent is extended or adjusted under 35 U.S.C. 154(b) by 0 days.

(21) Appl. No.: 14/511,219

(22) Filed: Oct. 10, 2014

(65) Prior Publication Data

US 2015/0175085 A1    Jun. 25, 2015

Related U.S. Application Data

(60) Provisional application No. 61/918,041, filed on Dec. 19, 2013.

(51) Int. Cl.
*B60R 9/06* (2006.01)
*B60R 3/00* (2006.01)

(52) U.S. Cl.
CPC ............... *B60R 9/065* (2013.01); *B60R 3/00* (2013.01)

(58) Field of Classification Search
CPC .............. B60R 9/065; B60R 9/06; B60R 3/00
USPC ....................................................... 224/489
See application file for complete search history.

(56) References Cited

U.S. PATENT DOCUMENTS

| | | | | |
|---|---|---|---|---|
| 4,974,866 A * | 12/1990 | Morgan | ................. | B60D 1/363 280/477 |
| 5,511,813 A * | 4/1996 | Kravitz | ..................... | B60D 1/42 280/495 |
| 6,036,070 A * | 3/2000 | Gauthier | ................. | B60R 9/065 224/521 |
| 6,769,704 B2 * | 8/2004 | Cipolla | .................... | B60R 3/007 224/521 |
| 7,059,158 B2 | 6/2006 | Freeman | | |
| 8,261,473 B2 * | 9/2012 | Bey | ......................... | G09F 15/00 211/118 |
| 8,393,657 B1 * | 3/2013 | Duderstadt | ............... | B60R 3/00 293/117 |
| 8,505,951 B2 | 8/2013 | Bohse | | |
| 8,631,982 B2 * | 1/2014 | Vicente | .................... | B60D 1/58 109/51 |
| 9,216,698 B2 * | 12/2015 | Rhodes | ................... | B60R 9/065 |
| 2004/0040351 A1 | 3/2004 | Alcott | | |
| 2006/0145461 A1 * | 7/2006 | Anderson | ................. | B60R 9/06 280/769 |
| 2009/0038558 A1 * | 2/2009 | Schulte | .................... | B60P 3/04 119/496 |

(Continued)

*Primary Examiner* — Adam Waggenspack
(74) *Attorney, Agent, or Firm* — Global Intellectual Property Agency, LLC; Daniel Boudwin

(57) ABSTRACT

A storage container removably securable to a hitch receiver of a vehicle. The storage container includes a bottom end, sidewalls, and an open upper end, defining an interior volume in which items can be stored. A lid is pivotally secured to the open upper end of the container by a hinge. The lid includes locking latches for securing the lid in a closed configuration. The storage container further includes a step on a lower end thereof that provides users with easy access to the bed of a pick-up truck when the storage container is secured to a pick-up truck. The storage container may further include one or more handles thereon. The storage container includes a pair of light assemblies that can be electrically connected to a vehicle's electrical system. The storage container further includes a hitch assembly for securing the storage container to the hitch receiver of a vehicle.

9 Claims, 3 Drawing Sheets

(56) References Cited

U.S. PATENT DOCUMENTS

| | | | |
|---|---|---|---|
| 2010/0051627 A1* | 3/2010 | Kucks | B60R 9/065 220/592.03 |
| 2012/0305612 A1* | 12/2012 | Bell, Jr. | B60R 9/06 224/519 |
| 2013/0239902 A1 | 9/2013 | Venne | |

* cited by examiner

STORAGE CONTAINER ATTACHABLE TO VEHICLE HITCH

CROSS REFERENCE TO RELATED APPLICATION

This application claims the benefit of U.S. Provisional Application No. 61/918,041 filed on Dec. 19, 2013, entitled "Hitch Lock Box." The above identified patent application is herein incorporated by reference in its entirety to provide continuity of disclosure.

BACKGROUND OF THE INVENTION

Field of the Invention

The present invention relates to a storage container. More specifically, the present invention describes a storage container removably securable to a hitch receiver of a vehicle. The storage container includes an interior volume suitable for organizing and storing various pieces of equipment therein, and a locking lid thereon. The storage container additionally includes handles, a step on a lower end thereof, a hitch ball, a pair of lighting assemblies, and a hitch assembly for securing the container to the hitch of a vehicle.

People often need to transport various pieces of equipment for outdoor activities, such as hunting, fishing, and camping, among others. People often use pick-up trucks when transporting a large amount of cargo because the flat bed provides users with a considerable amount of space for such equipment. However, equipment stored in a truck bed is vulnerable to theft and weather damage. While some people use covers to prevent items in a truck bed from becoming wet and to prevent the items from escaping the truck bed during transit, such covers do not prevent theft of items left within the truck bed.

Further, items placed in a truck bed are difficult to organize, as truck beds do not offer storage containers or dividers. Items placed in a truck bed may also shift around while the user is driving, which could result in damage to the objects stored therein. While users may try to tie down various items held within the truck bed, it is often impractical to tie down a large variety of items, and cables and ropes can only be tied to the perimeter of the truck bed. Thus, a device that enables users to secure and protect cargo is desired.

The present invention provides a storage container attachable to a hitch receiver of a vehicle. The storage container comprises a housing having a bottom end, sidewalls, and an open upper end, defining an interior volume. A lid is pivotally secured to the open upper end by means of one or more hinges. The lid includes locking latches thereon so that the lid can be secured to the container such that unauthorized users are prevented from gaining access thereto. The housing further includes handles on opposing sides thereof to facilitate transporting the storage container and positioning the container on a vehicle. A step is disposed on a lower end of the front wall that provides users with easy access to the bed of a pick-up truck when the storage container is secured to a pick-up truck. A hitch assembly is positioned on the lower end of the rear wall of the housing so that additional vehicle attachments or storage containers can be secured thereto. A rear wall of the housing includes a hitch assembly for securing the storage container to a hitch receiver of a vehicle. The housing additionally includes a pair of lighting assemblies on opposing sides of the front wall. The lighting assemblies are electrically connected to the vehicle so that the lighting assemblies can function similarly to the tail lights of a vehicle.

Description of the Prior Art

Devices have been disclosed in the prior art that relate to storage containers. These include devices that have been patented and published in patent application publications. These devices generally relate to storage containers securable to a vehicle hitch. The following is a list of devices deemed most relevant to the present disclosure, which are herein described for the purposes of highlighting and differentiating the unique aspects of the present invention, and further highlighting the drawbacks existing in the prior art.

One such device, U.S. Pat. No. 7,059,158 to Freeman discloses a lockbox securable to a conventional trailer hitch. The lockbox is adapted to store a small item such as a house key or vehicle key therein. The box includes apertures for receiving a pin therethrough, wherein the trailer hitch can be aligned with the apertures so as to secure the lockbox to the trailer hitch. Thus, Freeman discloses a lockbox securable inside of a conventional trailer hitch receiver, and fails to disclose a storage container having a step and lighting assemblies thereon.

Another device, U.S. Published Patent Application Number 2010/0051627 to Kucks et al. discloses a cooler chest attachable to a vehicle trailer hitch receiver. The cooler chest comprises a hitch tongue extending therefrom that can be removably engaged with the trailer hitch receiver. The hitch tongue is pivotally moved between a horizontal and vertical position. While Kucks et al. discloses a storage container attachable to a vehicle hitch, Kucks et al. does not disclose a storage container that comprises a step or having lighting assemblies thereon.

U.S. Pat. No. 8,505,951 to Bohse discloses a hitch mounted waste container transporter adapted to be secured to a hitch receiver on a vehicle. The device includes a hitch bar having one end attachable to a hitch receiver, and a second end having a bracket thereon. An intermediate bar is pivotally secured to the bracket and is movable between zero and twenty five degrees from the axis of the hitch bar. A container support bar is connected to the intermediate bar and is adapted to engage a waste container. Thus, Bohse fails to disclose a storage container attachable to a hitch of a vehicle, and only discloses a hitch mounted transporter to which a waste container can be secured.

U.S. Published Patent Application Number 2013/0239902 to Venne discloses a pet cage adapted to be secured to a trailer hitch of a vehicle. The cage comprises a floor, sidewalls, and a closed top, defining an interior volume. The cage includes a coupling end for attachment to a vehicle trailer hitch. Thus, Venne discloses a storage container attachable to a vehicle hitch, but fails to disclose a storage container comprising a locking lid, tail lights, and a step thereon.

Finally, U.S. Published Patent Application Number 2004/0040351 to Alcott discloses a storage container for securing vehicle keys and other similar objects. The device includes a container and a separable lid removably attached thereto. The device is attachable to a vehicle by means of a locking pin and padlock, among other locking means. The device can be inserted into a trailer hitch and secured thereto. Thus, Alcott fails to disclose a storage container having lighting assemblies, a step, and a hinged lid.

These prior art devices have several known drawbacks. Several devices in the prior art relate to storage containers attachable to the hitch of a vehicle, but fail to disclose a storage container having additional features and functionality. Devices in the prior art do not include a step thereon for providing access to the container or to a truck bed. Further, devices in the prior art do not include lighting assemblies that function similarly to a vehicle's tail lights for providing illumination and signaling on the rear of the storage container.

In light of the devices disclosed in the prior art, it is submitted that the present invention substantially diverges in design elements from the prior art and consequently it is clear that there is a need in the art for an improvement to existing storage container devices securable to vehicles. In this regard the instant invention substantially fulfills these needs.

SUMMARY OF THE INVENTION

In view of the foregoing disadvantages inherent in the known types of storage containers securable to a vehicle hitch now present in the prior art, the present invention provides a new storage container wherein the same can be utilized for providing convenience for the user when storing and transporting various goods in a container attachable to a vehicle.

It is therefore an object of the present invention to provide a new and improved vehicle hitch storage container device that has all of the advantages of the prior art and none of the disadvantages.

It is another object of the present invention to provide a vehicle hitch storage container for providing users with additional storage space for various items without occupying space in truck bed or trunk of a vehicle.

Another object of the present invention is to provide a vehicle hitch storage container comprising a locking lid to secure items therein and prevent theft of such items.

Yet another object of the present invention is to provide a vehicle hitch storage container comprising tail lights thereon for illuminating the rear of the storage container and vehicle.

Another object of the present invention is to provide a vehicle hitch storage container that includes a step thereon for providing easy access to the container or to a truck bed.

A further object of the present invention is to provide a vehicle hitch storage container that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
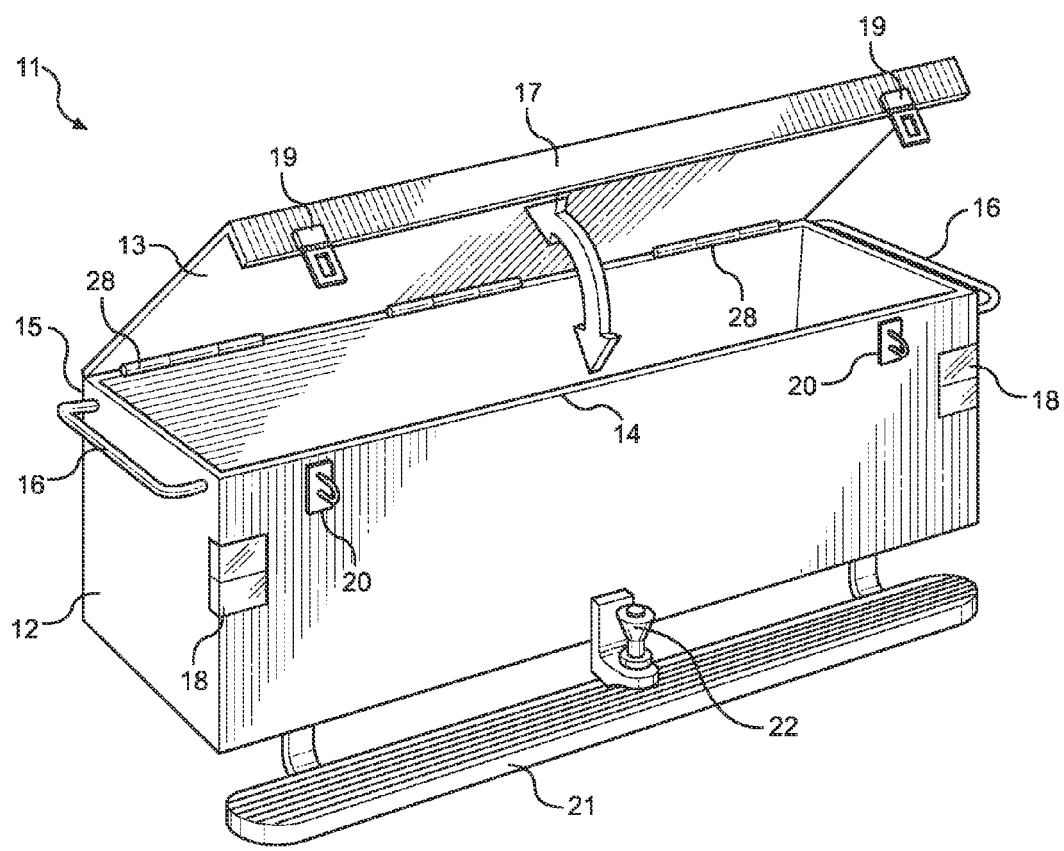
FIG. 1 shows a perspective view of the storage container of the present invention.

Reference is made herein to the attached drawings. Like reference numerals are used throughout the drawings to depict like or similar elements of the storage container of the present invention. For the purposes of presenting a brief and clear description of the present invention, the preferred embodiment will be discussed as used for securing a storage container to the hitch of a vehicle. The figures are intended for representative purposes only and should not be considered to be limiting in any respect.

Referring now to FIG. 1, there is shown a perspective view of the storage container of the present invention. The present invention describes a storage container 11 having a housing 12 having a bottom end, a front wall 14, a rear wall, a pair of sidewalls connecting said front wall 14 and rear wall, and an open upper end, defining an interior volume. The housing 12 is preferably substantially rectangular and includes shortened side walls and an elongated front wall 14 and rear wall. In some embodiments of the present invention, the interior volume comprises one or more compartments therein so that various articles and objects can be organized and secured therein. The housing 12 is preferably composed of a strong, durable material, such as stainless steel.

A lid 13 is pivotally secured to the open upper end of the housing 12 via a hinge thereon. The lid 13 can be pivoted between an open and closed configuration. In the illustrated embodiment, the lid 13 includes a flange 17 on a front end thereof. The flange 17 extends downward from said lid 13 and is perpendicular thereto. The flange 17 is adapted to be positioned on the upper portion of the exterior of the front wall 14 of the housing 12 when the lid 13 is in a closed configuration. The lid 13 includes one or more latches 19 thereon that are adapted to engage with a mating latch 20 on the front wall 14 of the housing 12. The latches 19 and mating latch 20 can be engaged so as to secure the lid 13 in a closed configuration. Further, the latches 19, may be lockable so that the contents of the housing 12 are secured therein and cannot be stolen or removed by an unauthorized person. Thus, the latches 19, 20 may include keyed locks, padlocks, combination locks, among others thereon in order to prevent unauthorized users from gaining access to the interior volume of the housing 12.

The storage container 11 further includes one or more handles 16 disposed on the housing 12. The handles 16 are preferably disposed on the sidewalls of the housing 12 near an upper end thereof. The handles 16 are used to allow users to more easily transport the storage container 11 and position the storage container 11 for connection to a vehicle hitch receiver. Additionally, the storage container 11 includes a hitch ball 22 on a lower portion of the front wall 14. However, in alternate embodiments, the storage container 11 may include a hitch receiver, or other hitch assembly thereon. Preferably, the hitch ball 22 is centrally located on the housing 12. The hitch ball 22 allows the vehicle to be used for towing additional storage containers or other equipment.

The storage container 11 of the present invention further includes a pair of lighting assemblies 18 thereon. The lighting assemblies 18 are preferably positioned on opposing sides of the front wall 14 of the housing 12. Thus, the lighting assemblies 18 are positioned similarly to the positioning of tail lights on an automobile. The lighting assemblies 18 may include tail lights and brake lights thereon. The lighting assemblies 18 can be operably connected to the electrical system of the vehicle by means of an electrical cable that extends outward from the rear wall of the housing 12. The electrical cable extends through or along the walls of the housing 12 so as to electrically connect to the lighting assemblies 18 on the housing 12. In this way, the lighting assemblies 18 function in conjunction with the lighting system of the vehicle. Thus, the lighting assemblies 18 are adapted to illuminate when the vehicle is turned on, the brake lights illuminate when the brakes are applied, and the lights flash when turn signals are activated. In this way, the storage container 11 provides warning and alerts to vehicles behind the user's vehicle, improving road safety.

The storage container 11 further includes a step 21 extending outward from a lower end of the front wall 14 of the housing 12. The step 21 is disposed in a horizontal orientation and substantially extends the length of the housing 12. The step 21 is secured to the storage container 12 via one or more support arms. Each arm includes a first end that is affixed to the bottom end of the housing 12 and a second end that is affixed to the step 21. The arms are separated by a space so as to evenly support to the step 21 attached thereto. The step 21 facilitates accessing the interior of the storage container 11, and helps users to enter the bed of a truck when the storage container 11 is attached to a pick-up truck. Thus, the step 21 preferably comprises treads or anti-skidding material thereon to prevent the user from slipping when entering the bed of the truck.

Figure 2:
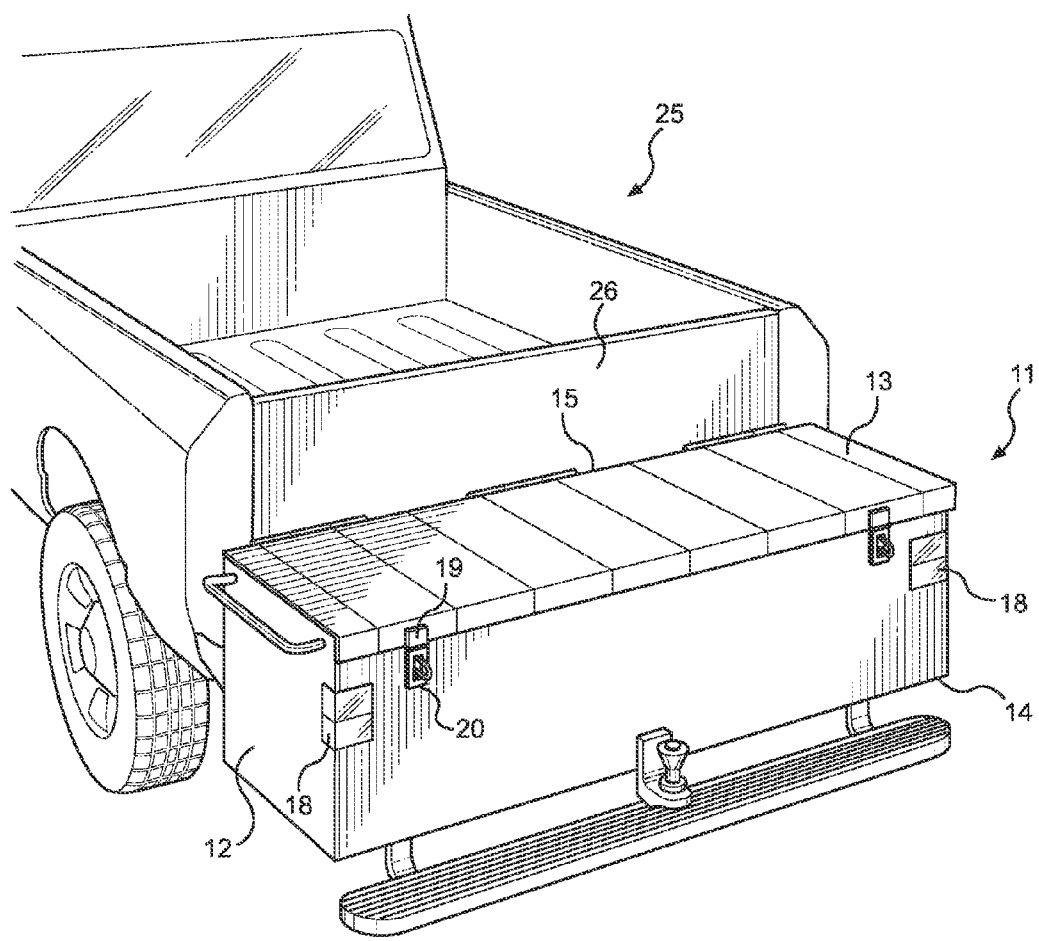
FIG. 2 shows a perspective view of the storage container of the present invention as secured to a pick-up truck.

Referring now to FIG. 2, there is shown a perspective view of the storage container of the present invention as secured to a vehicle 25, such as a pick-up truck. The storage container 11 includes a housing 12 having a rear wall 15 positioned adjacent to the rear 26 or bumper of the vehicle 25, and a front wall 14 that faces outward and away from the vehicle 25. The storage container 11 is secured to the vehicle 25 via a hitch assembly that is disposed on the rear wall 15 of the housing 12. When mounted, the storage container 11 and the step 21 are elevated above the ground. The lid 13 pivots about hinges on the rear wall 15 thereof, and opens such that the interior of the housing 12 is accessible from the front wall 14 thereof. The lid 13 can be locked so as to secure the contents of the housing 12 by mating the latches 19 on the lid 13 with the latches 20 on the front wall of the housing 12. The locking latches 19, may include a key lock, a pad lock, a combination lock, and the like.

Because the storage container 11 is positioned adjacent to the rear 26 of the vehicle 25, the tail light and brake lights of the vehicle 25 are at least partially obscured and are not easily visible to other drivers. Thus, the lighting assemblies 18 face outward from the housing 12 and are visible by drivers trailing the vehicle 25 to which the storage container 11 is secured. The lighting assemblies 18 are in electrical communication with the vehicle so that the lighting assemblies 18 can act as the tail lights and brake lights of the vehicle 25.

Figure 3:
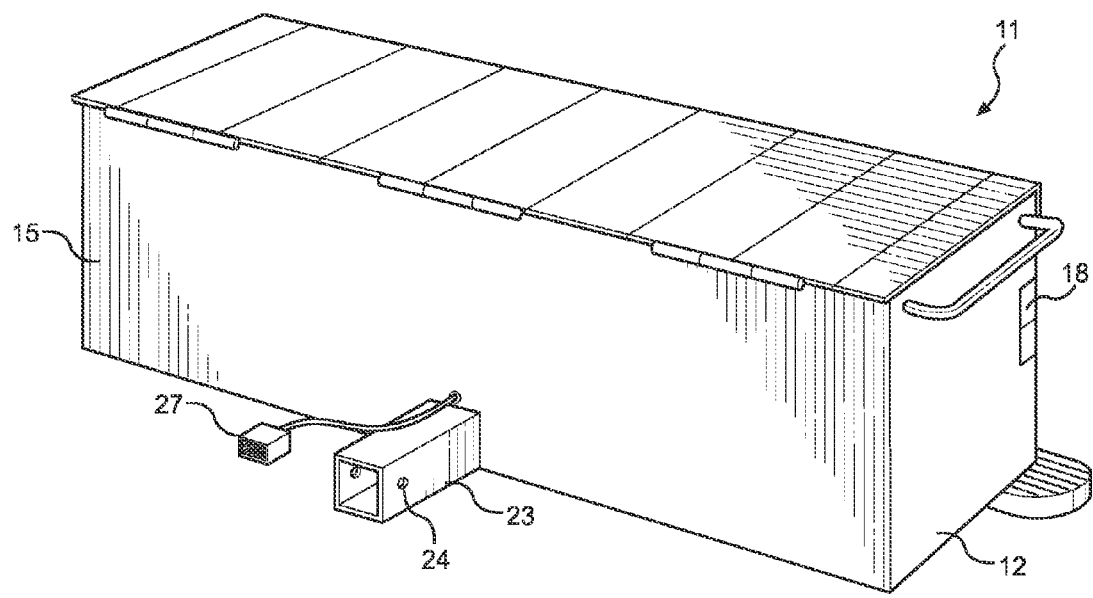
FIG. 3 shows a rear view of the storage container of the present invention and the hitch assembly thereon.

Referring now to FIG. 3, there is shown a rear view of the storage container of the present invention and the hitch assembly thereon. The rear wall 15 of the housing 12 includes a hitch assembly 23 affixed thereto. The hitch assembly 23 is preferably positioned centrally on a lower end of the rear wall 15. The hitch assembly 23 of the illustrated embodiment is permanently affixed to the rear wall 15 of the housing 12. The hitch assembly 23 includes an elongated tube having a substantially square cross section. The hitch assembly 23 is adapted to be inserted into a hitch receiver on a vehicle, such as a pick-up truck. The elongated tube includes a pair of apertures 24 on opposing sides thereof that are horizontally aligned. The pair of apertures 24 can be aligned with apertures on the hitch receiver of a vehicle, and one or more locking pins can be inserted through the aligned apertures in order to securely and removably connect the hitch assembly 23 to the vehicle.

The rear wall 15 of the housing 12 further includes an electrical cable 27 thereon that is electrically connected to the lighting assemblies 18 of the storage container 11. The electrical cable 27 is adapted to be connected to the electrical system of a vehicle via an attachment port on the rear of the vehicle adjacent to the hitch receiver of the vehicle. In this way, the lighting assemblies 18 can work in conjunction with the vehicle's lighting system so as to illuminate corresponding to the driver's actions such as braking, turning, and utilizing four-way-flashers, among others.

Figure 4:
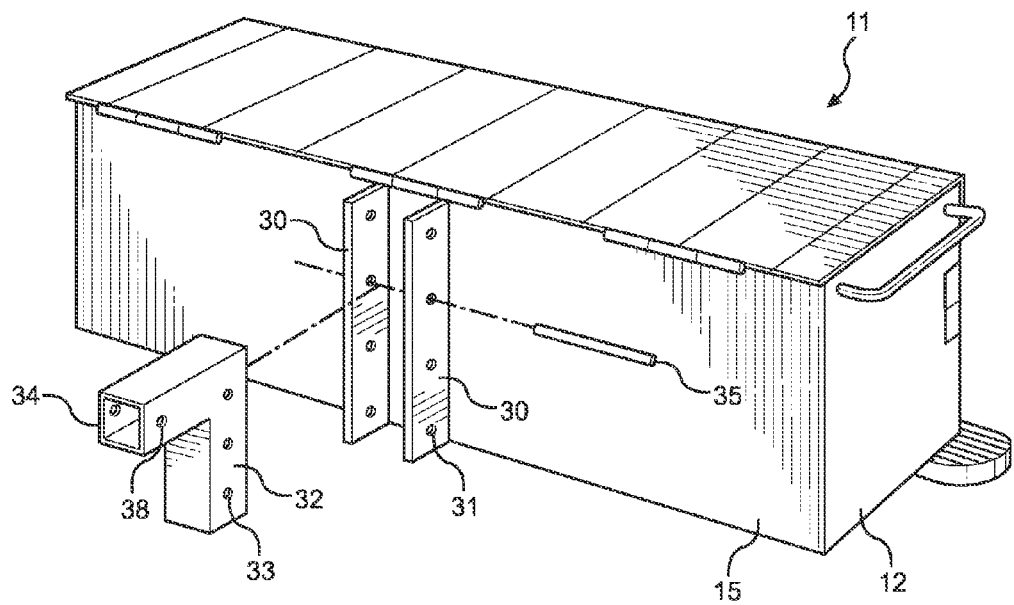
FIG. 4 shows a view of an embodiment of the storage container of the present invention having an adjustable hitch assembly.

Referring now to FIG. 4, there is shown a view of an embodiment of the storage container of the present invention having an adjustable hitch assembly. In the illustrated embodiment, the hitch assembly includes a pair of plates 30 permanently affixed to the rear wall 15 of the housing 12. The plates 30 extend from the lower end of the housing 12 to the upper end thereof, and are substantially parallel to one another. The plates 30 are perpendicular to the rear wall 15 of the housing 12 so that the plates 30 extend outward therefrom. The plates 30 are separated by a space in which a hitch connector 32 can be positioned. The plates 30 further include a plurality of apertures 31 thereon, wherein the apertures 31 on the plates 30 are horizontally aligned with one another. In this way, a pin 35 can be inserted through aligned apertures 31 on the pair of plates 30.

The hitch connector 32 includes an L-shaped member having a vertical section and a horizontal section. Preferably, the L-shaped member comprises a square cross section. It is contemplated that the width of the L-shaped member is substantially equal to the distance between the two plates 30 so that the L-shaped member can be inserted therebetween. The horizontal section 34 extends from the upper end of the L-shaped member and is adapted to be engaged with a hitch receiver on a vehicle. The horizontal section 34 includes a pair of apertures 38 on opposing sides thereof that are adapted to receive a locking pin 35 therethrough.

Opposing sides of the vertical section of the hitch connector 32 include a plurality of apertures 33 thereon such that a locking pin 35 can be inserted therethrough. Thus, the vertical section of the L-shaped member can be positioned between the pair of plates 30 on the rear wall 15 of the housing 12, and the apertures 33 on the L-shaped member can be aligned with apertures 31 on the pair of plates 30. In this way, the hitch connector 32 can be used to adjust the height of the storage container 11 relative to a vehicle on which it is positioned by aligning different sets of apertures 31 on the plates 30 with apertures 33 on the hitch connector 32 and inserting a locking pin 35 therethrough.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A storage container attachable to a vehicle, comprising:
   a housing having a bottom end, a front wall, a rear wall, a pair of sidewalls connecting said front wall and said rear wall, and an open upper end, defining an interior volume;
   a lid pivotally secured to said open upper end by means of one or more hinges;
   a height adjustable hitch assembly disposed on said rear wall of said housing adapted to engage with a hitch receiver of a vehicle;
   wherein the hitch assembly comprises a pair of plates disposed on the rear wall of the housing extending from a lower end of the housing to an upper end thereof;
   wherein the plates are substantially parallel to one another;
   wherein the plates are separated by a channel, the channel including an open upper end and an open lower end;
   wherein the plates comprise a plurality of apertures thereon, the plurality of apertures disposed along a longitudinal axis of the plates;
   a hitch connector consisting of an L-shaped member including a vertical section and a horizontal section extending from an upper end of the vertical section, the horizontal section for insertion into a vehicle hitch receiver;
   wherein the vertical section includes a plurality of apertures thereon, the plurality of apertures disposed along a longitudinal axis of the vertical section;
   wherein the plurality of apertures on the vertical section are aligned with the plurality of apertures on the pair of plates and secured thereto via a locking pin at any one of a vertical positions such that a longitudinal plane of the container is perpendicular to the longitudinal plane of the horizontal section; and
   a step comprising an elongated platform attached to said housing such that the elongated platform is positioned adjacent to a lower end of the front wall.

2. The storage container of claim 1, wherein said lid comprises one or more latches thereon adapted to secure said lid in a closed configuration.

3. The storage container of claim 2, wherein said one or more latches further include locks thereon.

4. The storage container of claim 1, further comprising a handle on each of said sidewalls of said housing.

5. The storage container of claim 1, further comprising a hitch ball on a lower end of said front wall.

6. The storage container of claim 1, further comprising a pair of lighting assemblies disposed on opposing sides of said front wall.

7. The storage container of claim 6, wherein said pair of lighting assemblies each includes a brake light and a tail light.

8. The storage container of claim 1, wherein said rear wall of said container includes an electrical cable adapted to be connected to an electrical system of said vehicle, wherein said electrical cable is in electrical connection with said pair of lighting assemblies.

9. The storage container of claim 1, wherein said hitch assembly comprises an elongated tube having a plurality of apertures thereon;
   wherein said plurality of apertures of said tube can be aligned with one or more apertures on said hitch receiver of said vehicle and secured thereto via a locking pin.

* * * * *